US010066971B2

(12) United States Patent
Nishioka et al.

(10) Patent No.: US 10,066,971 B2
(45) Date of Patent: Sep. 4, 2018

(54) ROTATION ANGLE DETECTION APPARATUS HAVING FUNCTION OF DETECTING ENTRY OF FOREIGN SUBSTANCE BASED ON FREQUENCY CHARACTERISTIC OF SIGNALS

(71) Applicant: FANUC CORPORATION, Minamitsuru-gun, Yamanashi (JP)

(72) Inventors: Akira Nishioka, Yamanashi (JP); Shunichi Odaka, Yamanashi (JP); Keisuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 8 days.

(21) Appl. No.: 15/249,854

(22) Filed: Aug. 29, 2016

(65) Prior Publication Data
US 2017/0059366 A1 Mar. 2, 2017

(30) Foreign Application Priority Data

Aug. 31, 2015 (JP) ................................ 2015-171154

(51) Int. Cl.
*G01D 5/347* (2006.01)
*G01D 5/244* (2006.01)

(52) U.S. Cl.
CPC ....... *G01D 5/3473* (2013.01); *G01D 5/24471* (2013.01); *G01D 5/34715* (2013.01)

(58) Field of Classification Search
CPC .... G01D 5/244; G01D 5/347; G01D 5/34715; G01D 5/3473; G01D 5/2448;
(Continued)

(56) References Cited

U.S. PATENT DOCUMENTS 4,633,423 A * 12/1986 Bailey ................... G01P 3/489
318/618
5,302,944 A 4/1994 Curtis
(Continued)

FOREIGN PATENT DOCUMENTS

CN 101114171 A 1/2008
CN 102472769 A 5/2012
(Continued)

OTHER PUBLICATIONS

Decision to Grant a Patent for Japanese Application No. 2015-171154, dated Jul. 19, 2017, including English translation, 6 pages.

*Primary Examiner* — Que T Le
*Assistant Examiner* — Jennifer Bennett
(74) *Attorney, Agent, or Firm* — RatnerPrestia

(57) ABSTRACT

A rotation angle detection apparatus includes a rotator having a track unit to detect the rotation angle of a rotation axis; a detection unit disposed in correspondence with the track unit; a rotation angle calculation unit for calculating the rotation angle of the rotation axis based on signals generated by the detection unit; a rotation speed calculation unit for calculating the rotation speed of the rotation axis; and an abnormality detection unit for detecting an abnormality. The abnormality detection unit includes a frequency analyzing unit for calculating the frequency characteristic of the signals; a storage unit for storing the number of the signals per revolution of the rotator; a signal frequency calculation unit for calculating a signal frequency; and a determination unit for detecting the abnormality in the detection apparatus, when the frequency characteristic includes a component of a higher order than the signal frequency.

1 Claim, 3 Drawing Sheets

(58) Field of Classification Search
CPC ........... G01D 5/24471; G01D 5/24476; G01D 5/24428; G01D 5/24457; G01D 5/34707; G01D 5/24451; G01R 31/2837; G01R 31/2841
See application file for complete search history.

(56) References Cited

U.S. PATENT DOCUMENTS

| | | | |
|---|---|---|---|
| 5,981,942 A | 11/1999 | Ieki | |
| 6,029,363 A | 2/2000 | Masreliez et al. | |
| 7,184,930 B2 * | 2/2007 | Miyasaka | B61F 15/20 246/169 A |
| 7,457,713 B2 | 11/2008 | Finkler et al. | |
| 8,072,176 B2 | 12/2011 | Ueda | |
| 8,969,789 B2 | 3/2015 | Sato et al. | |
| 9,007,056 B2 * | 4/2015 | Okamoto | G01R 31/2841 324/207.12 |
| 2002/0088934 A1 | 7/2002 | Blasing | |
| 2006/0167659 A1 | 7/2006 | Miyasaka et al. | |
| 2008/0215292 A1 | 9/2008 | Kato et al. | |

FOREIGN PATENT DOCUMENTS

| | | |
|---|---|---|
| CN | 103308078 A | 9/2013 |
| DE | 4400482 A1 | 10/1994 |
| DE | 19914447 A1 | 10/1999 |
| DE | 10041096 A1 | 3/2002 |
| DE | 102004038621 B3 | 2/2006 |
| JP | A-6-66594 | 3/1994 |
| JP | H09280891 A | 10/1997 |
| JP | 2001116760 A | 4/2001 |
| JP | A-2005-147733 | 6/2005 |
| JP | 2007064771 A | 3/2007 |
| JP | 2009063412 A | 3/2009 |
| JP | 2010203903 A | 9/2010 |
| JP | A-2010-266260 | 11/2010 |
| JP | 2012184957 A | 9/2012 |
| WO | 2010150416 A1 | 12/2010 |

* cited by examiner

ROTATION ANGLE DETECTION APPARATUS HAVING FUNCTION OF DETECTING ENTRY OF FOREIGN SUBSTANCE BASED ON FREQUENCY CHARACTERISTIC OF SIGNALS

BACKGROUND OF THE INVENTION

1. Field of the Invention

The present invention relates to a rotation angle detection apparatus, and more specifically relates to a rotation angle detection apparatus that has the function of detecting the entry of a foreign substance based on the frequency characteristic of signals.

2. Description of Related Art

Optical or magnetic detection devices having a plurality of signal tracks are used for measuring the angle of an output shaft of a motor or a table. As methods for detecting a malfunction in the detection device, a method in which a malfunction (alarm) in the detection device is detected when the amplitude of each signal is less than a specific threshold value (for example, Japanese Unexamined Patent Publication (Kokai) No. 2010-266260) and a method in which a malfunction (alarm) in the detection device is detected when signals of different phases have the same voltage value and an electrical angle at that time is different from a "normal electrical angle" stored in advance (for example, Japanese Unexamined Patent Publication (Kokai) No. 2005-147733) are known.

However, these methods detect a malfunction only after a motor or a machine tool equipped with the detection device breaks down. Preparing a maintenance component, after the malfunction has been detected, requires time for recovery of the motor or the machine tool, and therefore some maintenance components are often prepared in advance. However, the management of the maintenance components requires many man-hours and much storage space.

To solve the above problem, a method in which an abnormality in the amplitude of each signal is detected using a plurality of threshold values to anticipate the possibility of a malfunction before the detection device completely breaks down is known (for example, Japanese Unexamined Patent Publication (Kokai) No. 6-66594). However, there are various causes of malfunctions in the detection device, e.g. a break in a cable, electrical noise, and the entry of a foreign substance such as a cutting fluid, a lubricant, and chips into the detection device, thus making it difficult to specify a cause of the malfunction and carry out appropriate maintenance.

SUMMARY OF THE INVENTION

As described above, since a cause of a malfunction is difficult to identify using the conventional technique, maintenance cannot be carried out appropriately and the malfunction may be repeated after the maintenance. For this reason, a malfunction is required to be detected early to identify the cause of the malfunction. Specifically, a foreign substance having entered a detection device tends to cause a fatal malfunction, such as corrosion of components owing to a cutting fluid or damage to components owing to chips, and therefore should be detected at an early stage.

A rotation angle detection apparatus according to an embodiment of the present invention includes a rotator having a track unit to detect the rotation angle of a rotation axis; a detection unit disposed in correspondence with the track unit; a rotation angle calculation unit for calculating the rotation angle of the rotation axis based on signals generated by the detection unit; a rotation speed calculation unit for calculating the rotation speed of the rotation axis based on the signals; and an abnormality detection unit for detecting an abnormality based on the signals. The abnormality detection unit includes a frequency analyzing unit for calculating the frequency characteristic of the signals; a storage unit for storing the number of the signals generated from the track unit per revolution of the rotator; a signal frequency calculation unit for calculating a signal frequency that is the product of the number of the signals stored in the storage unit and the rotation speed calculated by the rotation speed calculation unit; and a determination unit for detecting the abnormality in the detection apparatus, when the frequency characteristic includes a component of a higher order than the signal frequency.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

Figure 1:
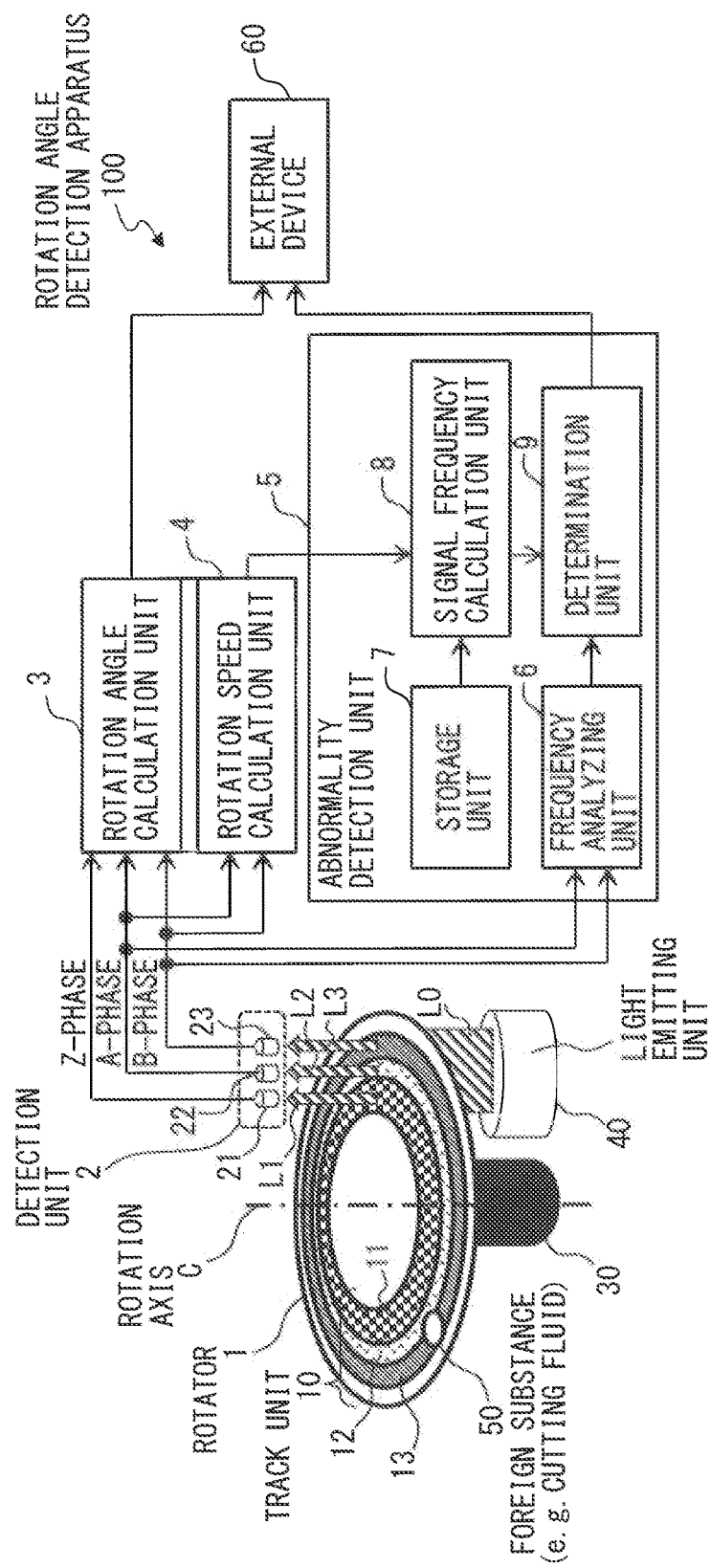
FIG. 1 is a block diagram of a rotation angle detection apparatus according to an embodiment of the present invention.

A rotation angle detection apparatus according to the present invention will be described below with reference to the drawings. FIG. 1 is a block diagram of a rotation angle detection apparatus according to an embodiment of the present invention. A rotation angle detection apparatus 100 according to the embodiment of the present invention has a rotator 1, a detection unit 2, a rotation angle calculation unit 3, a rotation speed calculation unit 4, and an abnormality detection unit 5. The abnormality detection unit 5 has a frequency analyzing unit 6, a storage unit 7, a signal frequency calculation unit 8, and a determination unit 9.

The rotator 1 includes a track unit 10 to detect the rotation angle of a rotation axis C. The rotator 1 is provided on a shaft 30 of a motor or the like, and rotated about the rotation axis C. The track unit 10 has a Z-phase track 11, an A-phase track 12, and a B-phase track 13. In the A-phase track 12 and the B-phase track 13, radial slits for producing an A-phase pattern and a B-phase pattern as detection patterns are continuously formed at regular pitch distances, respectively, in such positions as to be spatially 90 degrees out of phase. In the Z-phase track 11, a slit for producing a Z-phase pattern is formed. Taking the rotator 1 on which a foreign substance 50 such as a cutting fluid adheres as an example, the following description will be made.

A light emitting unit 40 including LEDs and the like is provided beneath the rotator 1. The light emitting unit 40 emits light L0 to the rotator 1.

The detection unit 2 is disposed in correspondence with the track unit 10. The detection unit 2 includes detection elements 21 to 23 each having a light receiving element such as a phototransistor or a photodiode. The detection element 21 is a Z-phase detection element that detects light L1 having passed through the slit provided at the Z-phase track 11, out of the light L0 emitted from the light emitting unit 40. Z-phase signals that contain information about the detected light L1 are outputted to the rotation angle calculation unit 3. The detection element 22 is an A-phase detection element that detects light L2 having passed through the slits provided at the A-phase track 12, out of the light L0 emitted from the light emitting unit 40. A-phase signals that contain information about the detected light L2 are outputted to the rotation angle calculation unit 3, the rotation speed calculation unit 4, and the frequency analyzing unit 6. The detection element 23 is a B-phase detection element that detects light L3 having passed through the slits provided at the B-phase track 13, out of the light L0 emitted from the light emitting unit 40. B-phase signals that contain information about the detected light L3 are outputted to the rotation angle calculation unit 3, the rotation speed calculation unit 4, and the frequency analyzing unit 6.

The rotation angle calculation unit 3 calculates the rotation angle of the rotation axis C based on the signals generated by the detection unit 2. The A-phase signal and the B-phase signal have a phase difference of 90 degrees. Thus, the rotation angle calculation unit 3 calculates the rotation direction and the rotation amount (angle) of the rotator 1 based on the A-phase signals and the B-phase signals.

The rotation speed calculation unit 4 calculates the rotation speed of the rotation axis C by detecting the frequencies of the A-phase signals and the B-phase signals.

The abnormality detection unit 5 detects an abnormality in the rotation angle detection apparatus 100 based on the A-phase signals and the B-phase signals as follows. First, the frequency analyzing unit 6 calculates the frequency characteristics of the A-phase signals and the B-phase signals. The frequency analysis may include, but is not limited to, an FFT analysis.

Figure 2:
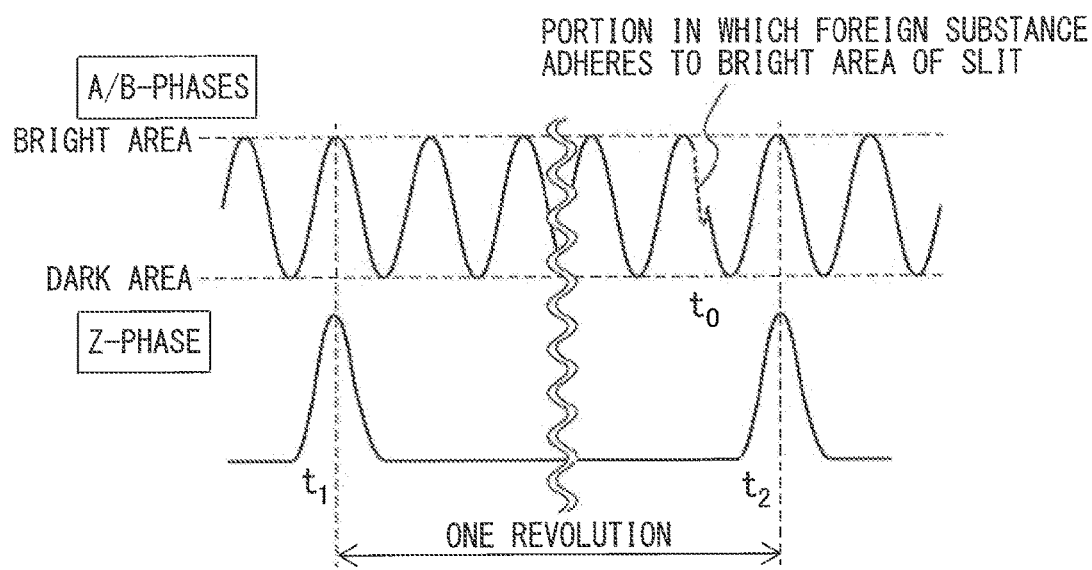
FIG. 2 is a waveform diagram of signals of an A-phase, a B-phase, and a Z-phase outputted from a detection unit of the rotation angle detection apparatus according to the embodiment of the present invention.

The storage unit 7 stores the number of the signals generated from the track unit 10 per revolution of the rotator 1. Time required for a revolution of the rotator 1 is obtained as a time between the adjoining Z-phase signals, as shown in the lower half of FIG. 2. In an example of FIG. 2, since the first Z-phase signal appears at a time $t_1$ and the next Z-phase signal appears at a time $t_2$, the time required for a revolution of the rotator 1 is calculated by $t_2-t_2$. The number of the A-phase signals or the B-phase signals appearing between the time $t_1$ and the time $t_2$ is counted and stored in the storage unit 7.

Figure 3:
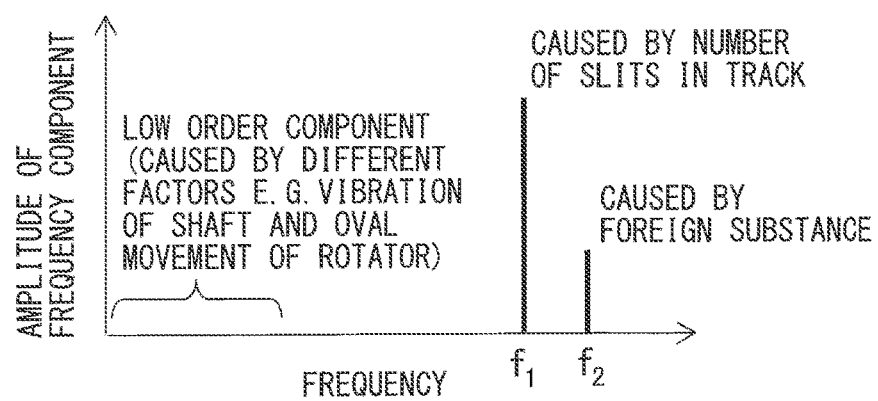
FIG. 3 is a graph showing the relationship between a frequency and the magnitude of frequency components of the output signals from the detection unit in the rotation angle detection apparatus according to the embodiment of the present invention.

The signal frequency calculation unit 8 calculates a signal frequency, that is, the product of the number of the A-phase signals or the B-phase signals stored in the storage unit 7 and the rotation speed calculated by the rotation speed calculation unit 4. For example, as shown in FIG. 3, the signal frequency is calculated to be $f_1$.

The determination unit 9 determines whether or not the frequency characteristic includes a component of a higher order than the calculated signal frequency $f_1$. For example, in a graph representing variations of the A-phase signals or the B-phase signals with time as shown in the upper half of FIG. 2, a deformation is observed at a time $t_0$ in a curve owing to a foreign substance adhering to a bright area of the slit (dotted line portion). As a result of the FFT analysis of the A-phase signals or the B-phase signals, when a high order component caused by the deformation in the curve owing to the foreign substance is observed at a frequency $f_2$ that is higher than the signal frequency $f_1$, an abnormality is detected.

When the determination unit 9 detects the abnormality, a detection result may be outputted to an external device 60. The external device 60 can issue an alarm based on the occurrence of the abnormality.

Note that, even though a component of a lower order than the signal frequency $f_1$ is observed, the component of the lower order is ascribable to a factor different from the adhesion of a foreign substance to the rotator 1, such as a vibration of the shaft 30 and an oval movement of the rotator 1. Thus, the component of the lower order is not determined to be caused by the adhesion of a foreign substance to the rotator 1.

Note that, FIG. 3 shows a case in which one foreign substance adheres, but an abnormality can be detected even when a plurality of foreign substances adhere.

Figure 4:
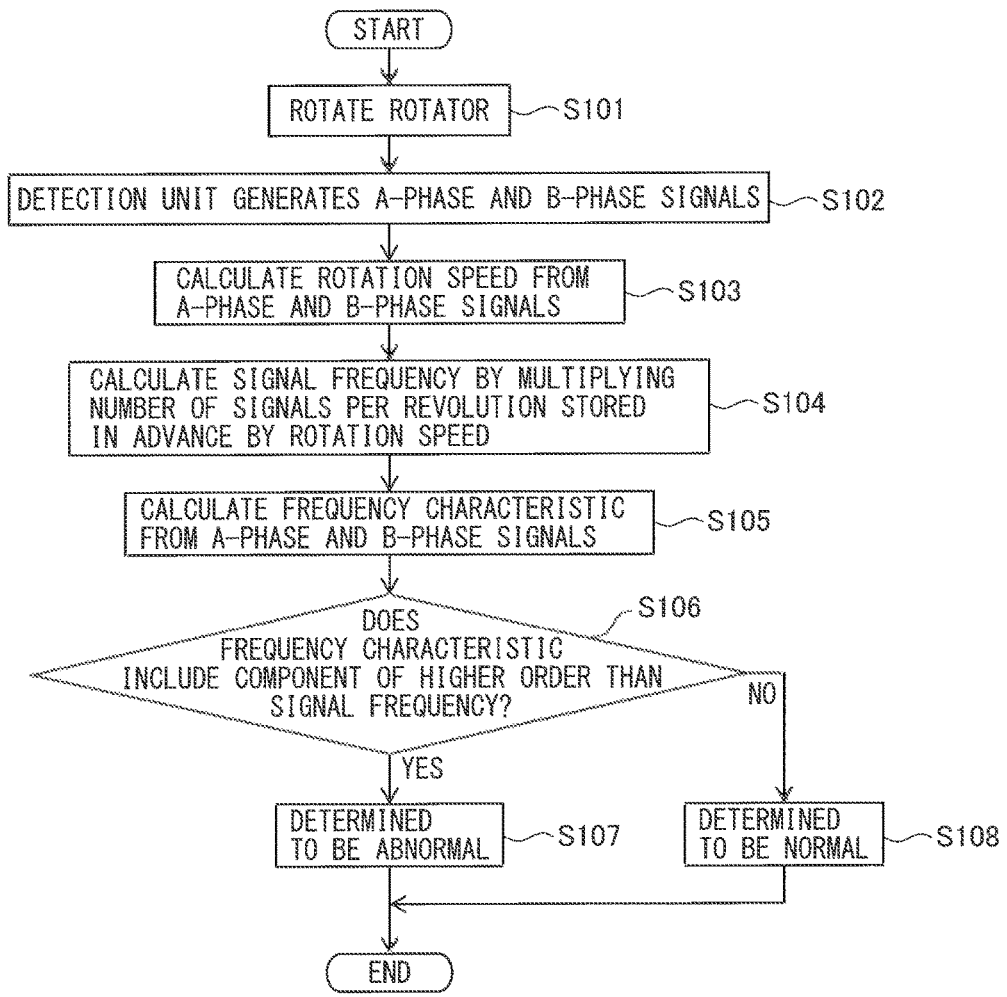
FIG. 4 is a flowchart for explaining the operation of the rotation angle detection apparatus according to the embodiment of the present invention.

Next, the operation of the rotation angle detection apparatus according to the embodiment of the present invention will be described with reference to a flowchart of FIG. 4. First, in step S101, the rotator 1 (see FIG. 1), which is provided on the shaft 30 of the motor and includes the track unit 10 for detecting the rotation angle of the rotation axis C, is rotated about the rotation axis C by driving the motor.

Next, in step S102, the detection unit 2 disposed in correspondence with the track unit 10 generates A-phase signals and B-phase signals based on light L2 and L3 that has been emitted by the light emitting unit 40 and passed through the slits formed in the A-phase track 12 and the B-phase track 13, respectively.

Next, in step S103, the rotation speed calculation unit 4 calculates the rotation speed of the rotation axis C based on the A-phase signals and the B-phase signals.

Next, in step S104, the signal frequency calculation unit 8 calculates a signal frequency by multiplying the number of the signals per revolution stored in advance in the storage unit 7 by the rotation speed.

Next, in step S105, the frequency analyzing unit 6 calculates a frequency characteristic based on the A-phase signals and the B-phase signals.

Next, in step S106, the determination unit 9 determines whether or not the frequency characteristic includes a component of a higher order than the signal frequency.

When the frequency characteristic includes the component of the higher order than the signal frequency, in step S107, an abnormality is determined to be present in the rotation angle detection apparatus 100.

On the other hand, when the frequency characteristic does not include the component of the higher order than the signal frequency, in step S108, the rotation angle detection apparatus 100 is determined to be normal.

As described above, detecting a frequency component having a higher order than a frequency that is ascribable to the number of the slits formed in the track unit and issuing an alarm signal allow the early detection of the entry of a foreign substance. Note that, the steps S103-S104 and the step S105 may be carried out concurrently or in reverse order.

The above description is made by taking an optical detection device as an example of the rotation angle detection apparatus, but the present invention is applicable in a like manner to a magnetic detection apparatus.

The rotation angle detection apparatus according to the embodiment of the present invention can detect the entry of a foreign substance (a cutting fluid or the like) before the detection apparatus breaks, and therefore carries out preventive maintenance of the detection apparatus.

What is claimed is:

1. A rotation angle detection apparatus comprising:
   a rotator and a track, the rotator configured to rotate the track around a rotation axis;
   a detector disposed in correspondence with the track; and
   a processor configured to:
      calculate a rotation angle of a rotation axis based on signals generated by the detector;
      calculate the rotation speed of the rotation axis based on the signals; and
      detect an abnormality based on the signals, by:
         calculating a frequency characteristic of the signals;
         storing the signals generated from the track per revolution of the rotator;
         calculating a signal frequency that is the product of the stored signals and the calculated rotation speed; and
         detecting the abnormality, when the frequency characteristic includes a component of a higher order than the signal frequency.

* * * * *